United States Patent Office 3,816,594
Patented June 11, 1974

3,816,594
PROCESS FOR REDUCING THE CONTENT OF NITROGEN OXIDES IN THE EXHAUST GASES FROM INTERNAL COMBUSTION ENGINES
Tadeusz P. Kobylinski, Cheswick, and Brian W. Taylor, Richland Township, Allegheny County, Pa., assignors to Gulf Research & Development Company, Pittsburgh, Pa.
No Drawing. Filed May 30, 1972, Ser. No. 257,558
Int. Cl. B01d 53/34
U.S. Cl. 423—213.5
21 Claims

ABSTRACT OF THE DISCLOSURE

In a process wherein an exhaust gas from an internal combustion engine containing nitrogen oxides as impurity is treated with a nickel, copper or iron catalyst under reducing conditions and the nitrogen oxides are converted to nitrogen and large amounts of ammonia, the improvement wherein the catalyst additionally contains ruthenium, with the result that substantially all of the nitrogen oxides are converted to nitrogen and little or no ammonia is formed.

---

This invention relates to the selective removal of nitrogen oxides in the exhaust gases from internal combustion engines. In particular, this invention relates to the selective removal of nitrogen oxides in the exhaust gases from internal combustion engines without the formation of significant amounts of ammonia.

Considerable research effort has been expanded over the past several years to discover means for the removal of nitrogen oxides in the exhaust gases from internal combustion engines. Nitrogen oxides constitute an undesirable air pollutant, but the removal of these nitrogen oxides, i.e., NO and $NO_2$, has proven to be a much more difficult problem than first anticipated. These problems and some of the solutions tried are described in the Paper "$NO_x$ Reduction Catalysts For Vehicle Emission Control," by G. H. Meguerian and C. R. Lange, published by the Society of Automotive Engineers, Inc. and presented as a part of the Automotive Engineering Congress Meeting in Detroit, Mich. on January 11–15, 1971. The problem is complicated by the fact that while several catalytic materials are available to convert nitrogen oxides (which are present in low concentrations in the exhaust gases from internal combustion engines) very rapidly to acceptable inert materials, such as nitrogen most of these catalysts are active only when pure reducing agents, such as carbon monoxide, are used in an anhydrous environment. Examples of these types of materials are the transition metal oxides, which are easily poisoned by trace amounts of water. It is obvious these catalytic materials are unacceptable for use in an automobile exhaust converter, since the automobile exhaust gases can contain up to 16 percent water.

Nickel, copper and iron retain their activity for the reduction of nitrogen oxides in the presence of water; however, hydrogen as a reducing agent using nickel, copper and iron as the reduction catalyst proved totally unacceptable, since hydrogen was found to react with the nirogen oxides to produce substantial amounts of unwanted ammonia. The use of carbon monoxide as a reducing agent is also undesirable, since it has a tendency to react with water over nickel, copper and iron by the well-known water gas shift reaction to give hydrogen and $CO_2$. The hydrogen would then, in turn, react preferentially with the nitrogen oxides to give ammonia. Ammonia is not only a pollutant per se, but, additionally, the ammonia, if present, would be reoxidized back to the undesirable nitrogen oxides in a second-stage reaction chamber, which would be normally employed to oxidize any unburned hydrocarbons or carbon monoxide in the exhaust gases to form $CO_2$ and water. As a consequence, the desired amount of nitrogen oxide removal could not be achieved. It was, of course, not possible to add the oxidizing gas to the first stage, since nickel, copper and iron catalysts do not function to reduce NO in the presence of a predominating oxidizing atmosphere.

We have found that substantially all of the nitrogen oxides in exhaust gases from internal combustion engines can be selectively reduced to form nitrogen as substantially the only nitrogen-containing compound, without formation of significant amounts of ammonia, by a process which comprises passing said exhaust gas at elevated temperatures in a reducing atmosphere into contact with a catalyst bed containing not only nickel, copper and iron but also ruthenium. By "substantially all of the nitrogen oxides" we mean that at least about 75 mol percent of the nitrogen oxides are converted herein, preferably at least about 85 mol percent are converted, but most preferably at least about 90 mol percent are converted.

The gas mixtures of interest for treatment in accordance with the process of this invention are those gas mixtures produced by the combustion of a hydrocarbon fuel using air, such as the exhaust gases from an internal combustion engine utilizing a hydrocarbon-type fuel. By "an internal combustion engine" we mean to include an engine having a combustion chamber wherein a hydrocarbon fuel is burned with molecular oxygen and the products of combustion are used to drive moving parts, such as a piston, rotors, etc. These hydrocarbon fuel exhaust gases contain small concentrations of NO and $NO_2$ where usually the mol ratio of NO to $NO_2$ exceeds 1:1.

An automobile exhaust gas that can be treated in accordance with the process defined and claimed herein would have a composition whose major components would be as shown in Table I below:

TABLE I

| | Components | Broad range, mol percent | Usual range, mol percent |
|---|---|---|---|
| 1 | $NO_x$, where x is 1 or 2 | 50 to 5,000 p.p.m.[2] | 100 to 3,500 p.p.m.[2] |
| 2 | Free molecular oxygen | 0 to 5 | 0.5 to 2. |
| 3 | Free molecular hydrogen | 0.1 to 4 | 0.2 to 1. |
| 4 | CO | 0.2 to 8 | 0.4 to 2. |
| 5 | Hydrocarbons [1] | 0 to 4,000 p.p.m.[2] | 50 to 1,000 p.p.m.[2] |
| 6 | $H_2O$ | 5 to 16 | 10 to 13. |
| 7 | $CO_2$ | 5 to 16 | Do. |
| 8 | Lead (as metal) | 0 to 12 p.p.m.[2] | 0 to 4 p.p.m.[2] |
| 9 | Nitrogen | 53 to 89 | 68 to 78. |

[1] Calculated as carbon.
[2] By volume.

As stated, the catalyst employed herein contains nickel, copper or iron. However, when these catalysts are used to treat an exhaust gas from an internal combustion engine containing nitrogen oxides as impurity under reducing conditions, not only are some of the nitrogen oxides converted to nitrogen, which is desirable, but an unacceptably large amount of ammonia is also formed. We have discovered, however, that if the catalyst containing nickel, copper or iorn additionally contains ruthenium, substantially all of the nitrogen oxides are converted to nitrogen and no appreciable amount of ammonia is formed.

The catalysts must be employed herein in effective catalytic amounts. Thus, the amount of nickel, copper or iron in the reaction zone must be in the range of about 0.011 to about 14.0, preferably in the range of about 0.022 to about 5.0, Troy ounce per 1000 cubic feet of exhuast gas being treated per hour. In order to convert substantially all of the nitrogen oxides to nitrogen, without the formation of significant amounts of ammonia, the catalyst also contains from about 0.0002 to about 0.5, preferably from about 0.001 to about 0.3, Troy ounce of ruthenium per 1000 cubic feet of exhaust gas being treated per hour. In general, however, the sum of the catalysts used should not exceed about 14.5 Troy ounce per 1000 cubic feet of exhaust gas being treated per hour, preferably should not exceed about 5.5 Troy ounce per 1000 cubic feet of exhaust gas being treated per hour. This is so because when amounts in excess thereof are employed the water gas shift reaction between carbon monoxide and water is facilitated, resulting in the formation of relatively large amounts of hydrogen. With the presence of this additional hydrogen in the reaction zone, the reaction between the nitrogen oxides and hydrogen would also be facilitated and there would be a tendency to form unacceptably large amounts of ammonia. On the other hand, in order to convert substantially all of the nitrogen oxides the combined total of catalysts present should be at least about 0.015 Troy ounce per 1000 cubic feet of exhaust gas being treated per hour, preferably at least about 0.035 Troy ounce per 1000 cubic feet of exhaust gas being treated per hour. The weight ratio of nickel, copper or iron to ruthenium will be on the order of about 200:1 to about 1:200, preferably about 100:1 to about 1:50. By "Troy ounce" of a metal we mean 31.1 grams of said metal. Although we have referred to the use of nickel, copper and iron alone with ruthenium, it is within the purview of this invention to use combinations thereof with ruthenium.

The catalysts used herein can be unsupported and in substantially pure form, but in a preferred embodiment they are suitably distended on a support. The amount of combined catalyst, calculated as metal, on the support can suitably be, for example, from about 0.5 to about 30.0 weight percent of the support, but is usually and preferably from about 1.0 to about 10.0 weight percent of the support.

The support for the catalysts to be used in the process of this invention can be any of the refractory oxide supports well-known in the art, such as those prepared from alumina, silica, magnesia, thoria, titania, zirconia, silica-aluminas, silica-zirconias, magnesia-aluminas, etc. In addition, the support can be an activated carbon, pumice, etc. Other suitable supports include the naturally-occurring clays, such as diatomaceous earth. In general, the surface area of these supports can be from about 10 m.$^2$ to about 500 m.$^2$ per gram, preferably from about 50 m.$^2$ to about 300 m.$^2$ per gram. Additional desirable supports for use herein are the more-recently developed corrugated ceramic materials made, for example, from alumina, silica and magnesia, lithium, etc. An example of such ceramic material is Therma Comb made by American Lava Corporation, Chattanooga, Tenn., which is more fully described in U.S. Pat. No. 3,444,925. If desired, the metals can be mounted directly onto the surface of the ceramic material, the ceramic material can first be coated with a refractory oxide, such as defined above, prior to the deposition of the metals thereon or the metals can be combined with the refractory oxide and the resultant combination can then be deposited on the ceramic material. The ceramic materials per se have a low surface area and high heat stability, and the addition of the refractory oxide coating increases the surface area to a more desirable range. In addition, these coated ceramics possess the further advantage of being easily formed in one piece. Very little, if any, pressure drop is experienced by the passage of exhaust gases through such ceramic materials.

Any suitable method well-known to those having ordinary skill in the art can be employed in the preparation of the supported catalysts used herein. For example, the appropriate amounts of ruthenium chloride and a suitable salt of nickel, copper and/or iron, for example, nickel nitrate, cuprous nitrate, ferrous nitrate, etc., can be dissolved in water and the concentration of each can be so adjusted to the amounts thereof desired on the support, for example, alumina. After contacting the support with such solution at room temperature and room pressure for a suitable period of time, for example, six hours, the catalyst is then dried and calcined in hydrogen, for example, for 16 hours at temperatures in the range of about 860° to 1000° F. If desired, calcination can be effected in air.

Another method involves impregnating alumina spheres with the solution described above and then drying the alumina spheres so prepared at room temperature. The dried spheres can then be immersed in a strong reducing solution, such as hydroxylamine hydrochloride, at room temperature, after which the solution is heated slowly to boiling. The spheres are then separated from the solution, dried and calcined in air at an elevated temperature, for example, 1000° F. It is difficult to categorize the form in which the metals find themselves on the support. Because of the high temperatures involved in their preparation and in their use as catalysts herein, it is likely that some alloying (solution of one metal in another) takes place, but it is also believed that some admixture of the two also results. In any event, regardless of the association in which the metals are found, they are effective herein for the stated purpose of converting substantially all of the nitrogen oxides to nitrogen without the formation of appreciable amounts of ammonia. Some of the metals on these supports can be present as a chemical compound, for example, as an oxide of ruthenium, nickel, copper or iron or some can be chemically and/or physically bonded to the surface of the support, for example, with an alumina base a chemical bond may exist between the surface oxide ions and the ruthenium nickel, copper or iron, but, in general, it is believed most of the metals are present in their elemental form.

The reaction conditions which are employed in the selective reduction of a nitrogen oxide using the catalyst of this invention are important in order to obtain a product wherein nitrogen is substantially the only nitrogen-containing product. By the statement that nitrogen is substantially the only nitrogen-containing product is meant that little or no ammonia is formed during the reduction despite the fact that the reduction occurs in the presence of hydrogen. In general, by following the procedure defined herein no more than about seven weight percent of the nitrogen oxides in the exhaust gas are converted to ammonia, but in most instances less than about three weight percent are converted to ammonia. It has been found that in order to selectively reduce the nitrogen oxides in the presence of hydrogen while producing substantially no ammonia, the conditions in the reaction zone should be a temperature of about 600° to about 1700° F., or even higher, preferably about 750° to about 1500° F. By operating the process as defined herein substantially all of the nitrogen oxides are converted to nitrogen and water and only a small amount thereof is converted to ammonia.

The reaction pressure is not critical and suitable pressures are from 0 to 150 pounds per square inch gauge, with the preferred pressure being atmospheric or slightly above. It has also been found that the catalysts used herein are effective at both low and high gas hourly space velocities (GHSV), i.e., at 8,000 to about 200,000, or even higher, volumes of gas per hour per volume of catalyst. In general, we prefer to operate at space velocities of about 10,000 to about 90,000. Here, as elsewhere in this specification, volumes are defined as being at standard conditions, that is, 760 mm. Hg and 0° C. In general, during idling an internal combustion engine, particularly of the automotive type, can produce as low as about 600 cubic feet per hour of exhaust gas and at extremely high speeds, for example, at speeds in excess of about 60 miles per hour, can produce as high as about 12,000 cubic feet per hour of exhaust gas, but, in general, from about 1500 to about 8000 cubic feet per hour of exhaust gas will be produced at speeds below about 60 miles per hour. An additional critical requirement herein is to maintain an effective reducing atmosphere in the reaction zone. By "reducing atmosphere" we mean an atmosphere wherein the stoichiometric ratio of molecular oxygen to the reducing agents in the reaction zone is less than 1:1, preferably about 0.9:1 or less. By "stoichiometric ratio of molecular oxygen to the reducing agents" we mean the amount of oxygen stoichiometrically required to convert the reducing agent or agents to their higher oxidation states. By "reducing agent" we mean to include substances which can be oxidized in the reaction zone by molecular oxygen, for example, substances such as hydrogen and carbon monoxide which can be converted to water and carbon dioxide, respectively.

The nickel, copper and/or iron and ruthenium catalyst is, of course, primarily meant to be utilized as part of a reactor system to be attached at any suitable location in the exhaust system of an automobile. The temperature of the reactor system can suitably be regulated to the desired temperature by the position of the reactor with respect to the gases exiting from the internal combustion engine. The further from the engine the reactor is placed, the cooler will be the gases entering the reactor. It may also be desirable to utilize some of the exhaust gases initially to preheat the reactor catalyst chamber before the gases enter into the catalyst chamber. A suitable means of doing this could be that disclosed in the Meguerian-Lange paper mentioned earlier.

It is also important with automotive exhaust gases to not only remove nitrogen oxides but also to remove unburned hydrocarbons and carbon monoxide. The removal of the unburned hydrocarbon and carbon monoxide can easily be achieved by subjecting the exhaust gases after treatment with the catalysts defined herein to an oxidation reaction using known catalysts under known oxidizing conditions. This oxidation must occur, however, in the substantial absence of ammonia, since ammonia will quickly reoxidize to form undesirable nitrogen oxides. By the use of the catalyst defined herein, utilizing the conditions as set forth herein, to obtain a product having substantially no ammonia, the product gases can then be oxidized in a second-stage converter utilizing oxidation catalysts, which are well-known in the art, under oxidation conditions to oxidize any unburned hydrocarbons and carbon monoxide to nonpolluting gases such as carbon dioxide and water. Usually combustion air is pressurized into the $NO_x$-free gases at a flow rate such that the average temperature of the catalyst bed is maintained at a level from about 800° to about 1700° F., preferably a temperature of 900° to 1100° F. Any of the metals of Group VIII, for example, platinum, palladium, ruthenium, etc. can successfully be employed in the oxidation of unburned hydrocarbons and CO to produce $CO_2$ and water in the presence of a combustion gas such as air. In addition, copper, vanadium or chromium-containing catalysts can also be used. These metals are usually distended on a support which can be the same as the supports described above for use with the reduction catalyst. Other typical oxidation catalysts, conditions and operational procedure can be the same as described in U.S. Pat. No. 3,503,715 to Haensel and the teachings of this patent are incorporated herein by reference. Still another procedure for the oxidation of unburned hydrocarbons and CO with molecular oxygen in the presence of oxidation catalysts is claimed in U.S. Pat. No. 3,257,163 to Stiles.

The results obtained herein are unexpected. As will be seen hereinafter, when the exhaust gas from an internal combustion engine containing nitrogen oxides as impurity is treated with a nickel, copper or iron catalyst under reducing conditions, nitrogen oxides are converted not only to nitrogen but in large part also to ammonia. Even though in our copending application Ser. No. 207,545, filed Dec. 13, 1971, we have shown that ruthenium unexpectedly will reduce nitrogen oxides in the exhaust gas from an internal combustion engine to nitrogen oxides without the formation of appreciable amounts of ammonia, it was surprising to us that the addition of ruthenium, even in small amounts, to nickel, copper or iron would so alter the catalyst and render the same effective in converting substantially all of the nitrogen oxides to nitrogen and substantially none to ammonia.

The invention will be further described with reference to the following experimental work.

Experiments were conducted with various metals supported on alumina spheres for the reduction of nitrogen oxide in the presence of hydrogen. The one-sixteenth inch diameter alumina spheres have the following characteristics: 190 m.²/gram surface area, 0.82 cc./gram pore volume, an average pore diameter of 185 A. and a density of 0.5 gram/cc. The metals were added to the alumina spheres by contacting them with an aqueous solution containing nickel nitrate, cuprous nitrate or ferrous nitrate or one of said metal salts and ruthenium chloride at atmospheric temperature and atmospheric pressure. The amount of metal salt used in each instance was adjusted so as to provide the desired amount of metal on the support. The catalyst was then dried and calcined in hydrogen for four hours at a temperature of 800° F. The gas treated was a synthetic gas of the following composition: 1.0 mol percent NO, 3.0 mol percent carbon monoxide, 3.0 mol percent hydrogen, 3.0 mol percent water and 90.0 mol percent argon. The gas was passed over a number of catalyts at 850° F. and 20,000 GHSV. The amount of metal in the examples in the specification was determined in accordance with the following equation:

$$\frac{\text{Weight Percent Metal On Support} \times 1000}{\text{GHSV} \times \text{Factor}},$$

wherein the factor is determined in accordance with the following equation:

$$\frac{31.1}{\text{Density Of Catalyst} \times 10 \times 28.31},$$

the number 31.1 being the number of grams in one Troy ounce, 28.31 being the number of liters in one cubic foot of gas, the GHSV is expressed in liters of gas per liter of catalyst per hour, and the density is defined in grams/cc. This simplifies to $$\frac{9,099.7 \times \text{Weight Percent Metal} \times \text{Density}}{\text{GHSV}},$$

wherein the weight percent metal is the weight percent metal on the catalyst as the percentage figure and not expressed as a weight fraction. The results obtained are tabulated in following Table II.

TABLE II

| Experiment number | Catalyst | Weight percent of catalyst on alumina | Troy ounce of metal per 1,000 cubic feet of gas per hour | Mol percent NO conversion | Weight percent NO converted to ammonia |
|---|---|---|---|---|---|
| 1 | Copper | 5.0 | 1.13 | 100 | 16.0 |
| 2 | do | 2.0 | 0.45 | 100 | 14.0 |
| 3 | do | 1.0 | 0.22 | 60 | 14.0 |
| 4 | Iron | 5.0 | 1.13 | 100 | 24.5 |
| 5 | do | 2.0 | 0.45 | 100 | 20.0 |
| 6 | do | 1.0 | 0.22 | 80 | 20.5 |
| 7 | Nickel | 5.0 | 1.13 | 100 | 19.9 |
| 8 | do | 1.0 | 0.22 | 50 | 17.5 |

The above clearly shows that the use of nickel, copper and iron alone results in the production of significantly large amounts of ammonia when the same are used to treat a gaseous mixture containing nitrogen oxide as impurity.

An additional series of runs was carried out as in Table II but wherein a small amount of ruthenium was also present in the catalyst. The results obtained are tabulated below in Table III.

TABLE III

| Experiment number | Catalyst | Weight percent of catalyst on alumina | Troy ounce of metal per 1,000 cubic feet of gas per hour | Mol percent NO conversion | Weight percent NO converted to ammonia |
|---|---|---|---|---|---|
| 9 | Copper/ruthenium | 5.0/0.5 | 1.13/0.11 | 100 | 3.5 |
| 10 | do | 2.0/0.5 | 0.45/0.11 | 100 | 1.8 |
| 11 | do | 1.0/0.5 | 0.22/0.11 | 100 | 1.5 |
| 12 | do | 1.0/0.2 | 0.22/0.04 | 100 | 2.0 |
| 13 | Nickel/ruthenium | 1.0/0.1 | 0.22/0.02 | 100 | 5.5 |
| 14 | do | 1.0/0.2 | 0.22/0.04 | 100 | 2.5 |
| 15 | do | 1.0/0.05 | 0.22/0.01 | 100 | 3.3 |
| 16 | Iron/ruthenium | 1.0/0.2 | 0.22/0.04 | 100 | 1.5 |

It can be seen from Experiment Nos. 9 to 16 that the addition of ruthenium to nickel, copper or iron results in each case in 100 percent conversion of NO with insignificant production of ammonia. Even when the amount of ruthenium present is but one-hundredth the amount of the remaining metallic component, as in Experiment No. 13, complete conversion of NO is obtained with insignificant amounts of ammonia.

Still another series of runs was carried out as in Table II but wherein a small amount of ruthenium was also present in the catalyst. The temperature was maintained at 900° F. in each run but the GHSV was varied. The results are summarized below in Table IV.

Table IV shows that the catalyst combination is effective in converting substantially all of the nitrogen oxide in the gas being treated without the significant production of ammonia even at high space velocities and exceedingly small amounts of catalyst, even though such catalyst contains very small amounts of ruthenium.

Yet another series of runs was carried out as in Table II at various temperature levels. The catalyst contained 0.2 weight percent ruthenium and 1.0 weight percent of copper, 1.0 weight percent of nickel or 1.0 weight percent of iron. At the indicated space velocity of 20,000, 0.04, 0.22, 0.22 and 0.22 Troy ounce, respectively, of ruthenium, copper, nickel and iron was used per 1000 cubic feet of gas treated. The results are tabulated below in Table V.

TABLE V

| | Copper/ruthenium | | Nickel/ruthenium | | Iron/ruthenium | |
|---|---|---|---|---|---|---|
| Experiment number | Reaction temperature, °F. | Mol percent NO conversion | Weight percent NO converted to ammonia | Mol percent NO conversion | Weight percent NO converted to ammonia | Mol percent NO conversion | Weight percent NO converted to ammonia |
| 27 | 600 | 100 | 0 | 100 | 1.5 | 100 | 0.5 |
| 28 | 800 | 100 | 1.5 | 100 | 3.5 | 100 | 1.8 |
| 29 | 900 | 100 | 1.5 | 100 | 2.4 | 100 | 1.0 |
| 30 | 1,100 | 100 | 1.0 | 100 | 3.0 | 100 | 0.8 |

The data in Table V show that effective results are obtained herein over a wide temperature range.

The experiments of Table III were repeated with a synthetic gas mixture of the following composition: 0.2 mol percent NO, 2.0 mol percent carbon monoxide, 0.6 mol percent hydrogen, 10 mol percent carbon dioxide, 10 mol percent water, 0.2 mol percent oxygen and 77.0 mol per-

TABLE IV

| Experiment number | GHSV | Catalyst | Weight percent of catalyst on alumina | Troy ounce of metal per 1,000 cubic feet of gas per hour | Mol percent NO conversion | Weight percent NO converted to ammonia |
|---|---|---|---|---|---|---|
| 17 | 20,000 | Nickel/ruthenium | 1.0/0.05 | 0.22/0.01 | 100 | 2.5 |
| 18 | 30,000 | do | 1.0/0.05 | 0.15/0.007 | 100 | 2.5 |
| 19 | 40,000 | do | 1.0/0.05 | 0.11/0.005 | 100 | 2.5 |
| 20 | 60,000 | do | 1.0/0.05 | 0.07/0.004 | 100 | 2.5 |
| 21 | 70,000 | do | 1.0/0.05 | 0.06/0.003 | 100 | 2.5 |
| 22 | 20,000 | do | 1.0/0.5 | 0.22/0.11 | 100 | 1.5 |
| 23 | 40,000 | do | 1.0/0.5 | 0.11/0.05 | 100 | 2.0 |
| 24 | 80,000 | do | 1.0/0.5 | 0.05/0.03 | 100 | 2.8 |
| 25 | 20,000 | Iron/ruthenium | 1.0/0.2 | 0.22/0.04 | 100 | 1.5 |
| 26 | 60,000 | do | 1.0/0.2 | 0.07/0.01 | 100 | 1.5 | cent argon. The results, comparable to those in Table III, are tabulated below in Table VI.

TABLE VI

| Catalyst | | Weight percent of catalyst on alumina | Troy ounce of metal per 1,000 cubic feet of gas per hour | Mol percent NO conversion | Weight percent NO converted to ammonia |
|---|---|---|---|---|---|
| Experiment number: | | | | | |
| 31 | Copper/ruthenium | 2.0/0.5 | 0.45/0.11 | 100 | 2.8 |
| 32 | do | 1.0/0.5 | 0.22;0.11 | 100 | 3.0 |
| 33 | do | 1.0/0.2 | 0.22/0.04 | 100 | 3.3 |
| 34 | Nickel/ruthenium | 1.0/0.2 | 0.22;0.04 | 100 | 4.4 |
| 35 | do | 1.0;0.05 | 0.22/0.01 | 100 | 6.1 |
| 36 | Iron/ruthenium | 1.0;0.2 | 0.22/0.04 | 100 | 3.8 |

As pointed out above, in the system defined herein an auto exhaust gas is first contacted with nickel, copper or iron and ruthenium under reducing conditions to convert nitrogen oxides to nitrogen and then in a second stage is contacted with oxidation catalyst, such as platinum, under oxidation conditions to convert unburned hydrocarbons and carbon monoxide to carbon dioxide and water. Since the second stage is further removed from the engine than the first, it will reach operative temperature levels later than the first. Accordingly, during the initial stages of operation, for example, from about 20 seconds to about two minutes after start-up, unburned hydrocarbons and carbon monoxide will not be satisfactorily oxidized in the second stage until adequate oxidation temperature levels are reached therein.

Utilization of the first stage reactor for oxidation during the initial stages of operation can provide a satisfactory solution to the problem. Thus, for example, during the initial stages of operation, oxygen can be introduced into the first stage in amounts sufficient to create an oxidation atmosphere therein so that oxidation of unburned hydrocarbons and carbon monoxide takes place in the presence of nickel, copper or iron and ruthenium. Since operation of the engine during the initial stages is under closed choke with a rich fuel mixture, nitrogen oxide emissions are low and no urgency exists to convert whatever nitrogen oxides are produced to nitrogen. After initial operation, the temperature in the second stage will quickly reach oxidation temperature levels. Then the oxygen flow is terminated to the first stage reactor but is made to the second stage reactor. Thereafter reducing conditions are maintained in the first stage and oxidation in the second, and each stage functions in the manner previously described above.

An outstanding, and unexpected advantage, of the process defined herein is that when the catalyst in the first stage is nickel, copper or iron and ruthenium the same functions not only as a reducing catalyst but also as an oxidation catalyst during the initial stages of operation as described above. Temperature sufficient for oxidation during the initial stage of operation can be in the range of about 350° to about 1500° F., preferably from about 450° to about 1200° F.

Although we have shown in the specific examples herein that effective results are obtained with a catalyst containing nickel, copper or iron and ruthenium, it is within the scope of our invention to use the above in combination with other materials, for example, promoters, such as potassium, sodium, calcium, barium, magnesium, lithium, rubidium, cesium, strontium and thallium.

Resort may be had to such variations and modifications as fall within the spirit of the invention and the scope of the appended claims.

We claim:

1. In a process wherein an exhaust gas from an internal combustion engine containing nitrogen oxides as impurity is treated with a metal selected from the group cosisting of nickel, copper and iron under reducing contions and the nitrogen oxides are converted to a product containing large amounts of ammonia, the improvement which comprises reducing said nitrogen oxides to selectively form nitrogen as substantially the only nitrogen-containing compound by contacting said exhaust gas at an elevated temperature of at least about 600° F. with about 0.011 to about 14.0 Troy ounce of said metal and with about 0.0002 to about 0.5 Troy ounce of ruthenium per 1000 cubic feet of exhaust gas per hour.

2. The process of claim 1 wherein said metal is nickel.
3. The process of claim 1 wherein said metal is copper.
4. The process of claim 1 wherein said metal is iron.
5. The process of claim 1 wherein the amount of said metal is within the range of about 0.022 to about 5.0 Troy ounce and the amount of ruthenium is within the range of about 0.001 to about 0.3 Troy ounce per 1000 cubic feet of exhaust gas per hour.
6. The process of claim 1 wherein the weight ratio of said metal to ruthenium is in the range of about 200:1 to about 1:200.
7. The process of claim 1 wherein the weight ratio of said metal to ruthenium is in the range of about 100:1 to about 1:50.
8. The process of claim 1 wherein said elevated temperature is in the range of about 600° to about 2000° F.
9. The process of claim 1 wherein said elevated temperature is in the range of about 750° to about 1500° F.
10. The process of claim 1 wherein the metals are on a support.
11. The process of claim 1 wherein the metals are on a support selected from the group consisting of alumina, silica, magnesia, thoria, titania, zirconia or mixtures thereof.
12. The process of claim 1 wherein the metals are supported directly on a ceramic base or on a ceramic base carrying a refractory oxide.
13. The process of claim 1 wherein the metals are on a support and the exhaust gas is passed through the reaction zone at a gas hourly space velocity of about 8,000 to about 200,000.
14. The process of claim 1 wherein the metals are on a support and the exhaust gas is passed through the reaction zone at a gas hourly space velocity of about 10,000 to about 90,000.
15. The process of claim 1 wherein the metals are on a support in an amount of about 0.5 to about 30.0 weight percent.
16. The process of claim 1 wherein the metals are on a support in an amount of about 1.0 to about 10.0 weight percent.
17. The process of claim 1 wherein the treated gases are further reacted in a second stage oxidation reactor in the presence of an added gas containing free molecular oxygen to oxidize any hydrocarbons or carbon monoxide therein to a product comprising $CO_2$ and water.
18. The process of claim 17 wherein said oxidation is carried out in the presence of a Group VIII metal.
19. The process of claim 1 wherein the combined total of metals is present in an amount ranging from about 0.015 to about 14.5 Troy ounce per 1000 cubic feet of exhaust gas per hour.
20. The process of claim 1 wherein the combined total of metals is present in an amount ranging from about 0.035 to about 5.5 Troy ounce per 1000 cubic feet of exhaust gas per hour.

21. The process of claim 1 wherein during the initial stages of operation prior to reduction oxygen is introduced into the reaction zone sufficient to create an oxidation atmosphere therein.

References Cited
UNITED STATES PATENTS

| | | | |
|---|---|---|---|
| 3,565,574 | 2/1971 | Kearby | 423—213 |
| 2,601,221 | 6/1952 | Rosenblatt | 423—351 |
| 3,230,034 | 1/1966 | Stiles | 423—213 |
| 3,370,914 | 2/1968 | Gross et al. | 423—213 |
| 3,662,540 | 5/1972 | Murphey | 60—301 |

OTHER REFERENCES

Berstein et al., "Application of Catalysts to Automotive $NO_x$ Control," SAE Paper 710014, January 1971.

GEORGE O. PETERS, Primary Examiner

U.S. Cl. X.R.

423—213.7; 60—301; 252—472

UNITED STATES PATENT OFFICE
CERTIFICATE OF CORRECTION

Patent No.  3,816,594          Dated  June 11, 1974

Inventor(s)  Tadeusz P. Kobylinski and Brian W. Taylor

It is certified that error appears in the above-identified patent and that said Letters Patent are hereby corrected as shown below:

Column 1, line 31, "expanded" should be "expended".

Column 2, line 3, "nirogen" should be "nitrogen".

Column 7, Table IV, third column of Experiments 22, 23 and 24, "do" should be replaced with "Copper/Ruthenium" in each instance.

Column 8, Table III, last column of Experiment 10, "1.8" should be "1.5".

Column 8, Table V, column 5 of Experiment 30, "3.0" should be "1.0".

Signed and sealed this 1st day of October 1974.

(SEAL)
Attest:

McCOY M. GIBSON JR.            C. MARSHALL DANN
Attesting Officer              Commissioner of Patents